(12) United States Patent
Palikuqi et al.

(10) Patent No.: US 10,398,973 B2
(45) Date of Patent: Sep. 3, 2019

(54) SYSTEM AND METHOD FOR PROCESSING RANDOM EVENTS

(71) Applicant: MZ IP Holdings, LLC, Palo Alto, CA (US)

(72) Inventors: Ajk Palikuqi, Santa Clara, CA (US); Garth Gillespie, Palo Alto, CA (US)

(73) Assignee: MZ IP Holdings, LLC, Palo Alto, CA (US)

( * ) Notice: Subject to any disclaimer, the term of this patent is extended or adjusted under 35 U.S.C. 154(b) by 25 days.

(21) Appl. No.: 15/850,056

(22) Filed: Dec. 21, 2017

(65) Prior Publication Data

US 2018/0200624 A1 Jul. 19, 2018

Related U.S. Application Data

(60) Provisional application No. 62/447,611, filed on Jan. 18, 2017.

(51) Int. Cl.

| | |
|---|---|
| *G07F 17/32* | (2006.01) |
| *A63F 13/47* | (2014.01) |
| *A63F 13/69* | (2014.01) |
| *A63F 13/00* | (2014.01) |
| *G06F 17/18* | (2006.01) |

(52) U.S. Cl.
CPC ............ *A63F 13/47* (2014.09); *A63F 13/00* (2013.01); *A63F 13/69* (2014.09); *G06F 17/18* (2013.01); *A63F 2300/609* (2013.01); *A63F 2300/632* (2013.01)

(58) Field of Classification Search
CPC .................................................... G07F 17/32
See application file for complete search history.

(56) References Cited

U.S. PATENT DOCUMENTS 7,467,170 B1 12/2008 Chen et al.

FOREIGN PATENT DOCUMENTS

WO WO-2015/057837 A1 4/2015

OTHER PUBLICATIONS

Collins, Robert, "Intro to Sampling Methods," CSE586 Computer Vision II, Spring 2010 Penn State University, 7 pages.
"Distributions—Help me understand the quantile (inverse CDF) function—Cross Validated," accessed on the internet at: http://stats.stackexchange.com/questions/212813/help-me-understand-the-quantile-inverse-cdf-function/; downloaded Nov. 27, 2017; 2pgs.
Int'l Search Report and Written Opinion of the ISA/EP in PCT/US2018/013513; dated Apr. 24, 2018; 14pgs.

*Primary Examiner* — Reginald A Renwick
(74) *Attorney, Agent, or Firm* — Goodwin Procter LLP

(57) ABSTRACT

Implementations of the present disclosure are directed to a method, a system, and an article for managing the use of global position information in a multi-player online game. An example computer-implemented method can include: identifying a number of random events for which each random event has a plurality of possible outcomes and each possible outcome has a respective probability of occurrence for each random event; selecting a first possible outcome from the plurality of possible outcomes; determining a probability distribution for the first possible outcome that defines a relationship between (i) a number of occurrences of the first possible outcome in the number of random events and (ii) a range of probabilities; selecting a first probability from the range of probabilities; and determining the number of occurrences of the first possible outcome based on the probability distribution and the selected first probability.

20 Claims, 5 Drawing Sheets

SYSTEM AND METHOD FOR PROCESSING RANDOM EVENTS

CROSS-REFERENCE TO RELATED APPLICATIONS

This application claims the benefit of U.S. Provisional Patent Application No. 62/447,611, filed Jan. 18, 2017, the entire contents of which are incorporated by reference herein.

BACKGROUND

The present disclosure relates to the processing of random events and, in some examples, to systems and methods for determining outcomes for random events in computer-implemented applications, such as multi-player online games.

In general, a multi-player online game can be played by hundreds of thousands or even millions of players who use client devices to interact with a virtual environment for the online game. The players are typically working to accomplish tasks, acquire assets, or achieve a certain score or level in the online game. Some games require or encourage players to form groups or teams that can play against other players or groups of players.

Multi-player online games often involve random events that are processed to determine an outcome for each event. Processing random events can be computationally expensive, particularly when the number of random events is large.

SUMMARY

In general, the systems and methods described herein relate to an improved approach for determining the outcomes of a plurality of random events in computer games and other computer applications. By using an inverse cumulative distribution function (ICDF), or similar probability distribution, the systems and methods can avoid having to process or loop through each random event individually and can instead process a group of random events simultaneously.

Advantageously, compared to prior approaches, the systems and methods described herein can achieve a significant reduction in computation times. For example, when processing N random events that each have M possible outcomes, the computation times for the systems and methods can be O(M), such that the computation times can be proportional to the number of possible outcomes M but insensitive to the number of random events N. By contrast, computation times for prior approaches can be O(N), such that the computation times can be proportional to the number of random events N but insensitive to the number of possible outcomes M. The approach described herein can achieve a significant reduction in computation times, particularly when the number of random events N is greater than the number of possible outcomes M, which is often the case in computer games and similar applications. For example, if N/M is 10, 1000, or 1,000,000, the approach described herein can reduce computation times by a factor of about 10, about 1000, or about 1,000,000, respectively, compared to prior approaches.

In one aspect, the subject matter described in this specification relates to a method. The method includes: identifying a number of random events, each random event having a plurality of possible outcomes, each possible outcome having a respective probability of occurrence for each random event; selecting a first possible outcome from the plurality of possible outcomes; determining, by one or more computer processors, a probability distribution for the first possible outcome, the probability distribution defining a relationship between (i) a number of occurrences of the first possible outcome in the number of random events and (ii) a range of probabilities; selecting, by the one or more computer processors, a first probability from the range of probabilities; and determining, by the one or more computer processors, the number of occurrences of the first possible outcome based on the probability distribution and the selected first probability.

In certain implementations, a sum of the respective probabilities for the possible outcomes is equal to one. The probability distribution can be based on the number of random events and the probability of occurrence for the first possible outcome. The probability distribution can be or include the inverse cumulative distribution function. The range of probabilities can be from 0 to 1. Selecting the first probability can include generating a first random number.

In some examples, the method includes: selecting a second possible outcome from the plurality of possible outcomes; determining a remaining number of random events based on the number of random events and the determined number of occurrences of the first possible outcome; determining a probability distribution for the second possible outcome, the probability distribution defining a relationship between (i) a number of occurrences of the second possible outcome in the remaining number of random events and (ii) the range of probabilities; selecting a second probability from the range of probabilities; and determining the number of occurrences of the second possible outcome based on the probability distribution and the selected second probability. Determining the remaining number of random events can include subtracting the determined number of occurrences of the first possible outcome from the number of random events. The probability distribution can be based on the remaining number of random events and the probability of occurrence for the second possible outcome. Selecting the second probability can include generating a second random number.

In another aspect, the subject matter described in this specification relates to a system. The system includes one or more computer processors programmed to perform operations including: identifying a number of random events, each random event having a plurality of possible outcomes, each possible outcome having a respective probability of occurrence for each random event; selecting a first possible outcome from the plurality of possible outcomes; determining a probability distribution for the first possible outcome, the probability distribution defining a relationship between (i) a number of occurrences of the first possible outcome in the number of random events and (ii) a range of probabilities; selecting a first probability from the range of probabilities; and determining the number of occurrences of the first possible outcome based on the probability distribution and the selected first probability.

In certain implementations, a sum of the respective probabilities for the possible outcomes is equal to one. The probability distribution can be based on the number of random events and the probability of occurrence for the first possible outcome. The probability distribution can be or include the inverse cumulative distribution function. The range of probabilities can be from 0 to 1. Selecting the first probability can include generating a first random number.

In some examples, the operations include: selecting a second possible outcome from the plurality of possible outcomes; determining a remaining number of random events based on the number of random events and the determined number of occurrences of the first possible outcome; determining a probability distribution for the second possible outcome, the probability distribution defining a relationship between (i) a number of occurrences of the second possible outcome in the remaining number of random events and (ii) the range of probabilities; selecting a second probability from the range of probabilities; and determining the number of occurrences of the second possible outcome based on the probability distribution and the selected second probability. Determining the remaining number of random events can include subtracting the determined number of occurrences of the first possible outcome from the number of random events. The probability distribution can be based on the remaining number of random events and the probability of occurrence for the second possible outcome. Selecting the second probability can include generating a second random number.

In another aspect, the subject matter described in this specification relates to an article. The article includes a non-transitory computer-readable medium having instructions stored thereon that, when executed by one or more computer processors, cause the computer processors to perform operations including: identifying a number of random events, each random event having a plurality of possible outcomes, each possible outcome having a respective probability of occurrence for each random event; selecting a first possible outcome from the plurality of possible outcomes; determining a probability distribution for the first possible outcome, the probability distribution defining a relationship between (i) a number of occurrences of the first possible outcome in the number of random events and (ii) a range of probabilities; selecting a first probability from the range of probabilities; and determining the number of occurrences of the first possible outcome based on the probability distribution and the selected first probability.

Elements of embodiments described with respect to a given aspect of the invention can be used in various embodiments of another aspect of the invention. For example, it is contemplated that features of dependent claims depending from one independent claim can be used in apparatus, systems, and/or methods of any of the other independent claims

DETAILED DESCRIPTION

In various implementations, the subject matter of this disclosure relates to the processing of random events in computer games and similar applications. Each random event can have a plurality of possible outcomes, and each possible outcome can be associated with a probability that the outcome will occur. In the context of a computer game, for example, a user or player of the game can receive a treasure chest or other virtual container that can include one of three possible items: item A, item B, and item C. Each item can have a probability (e.g., assigned by a game operator or developer) indicating a likelihood that the treasure chest contains the item. In certain examples, a random number can be generated to determine, based on the probabilities, which item is present in the treasure chest. When the number of treasure chests is large (e.g., 100, 1000, 1,000,000, or more), the computations required to determine the contents of all the treasure chests can be excessive.

Figure 1:
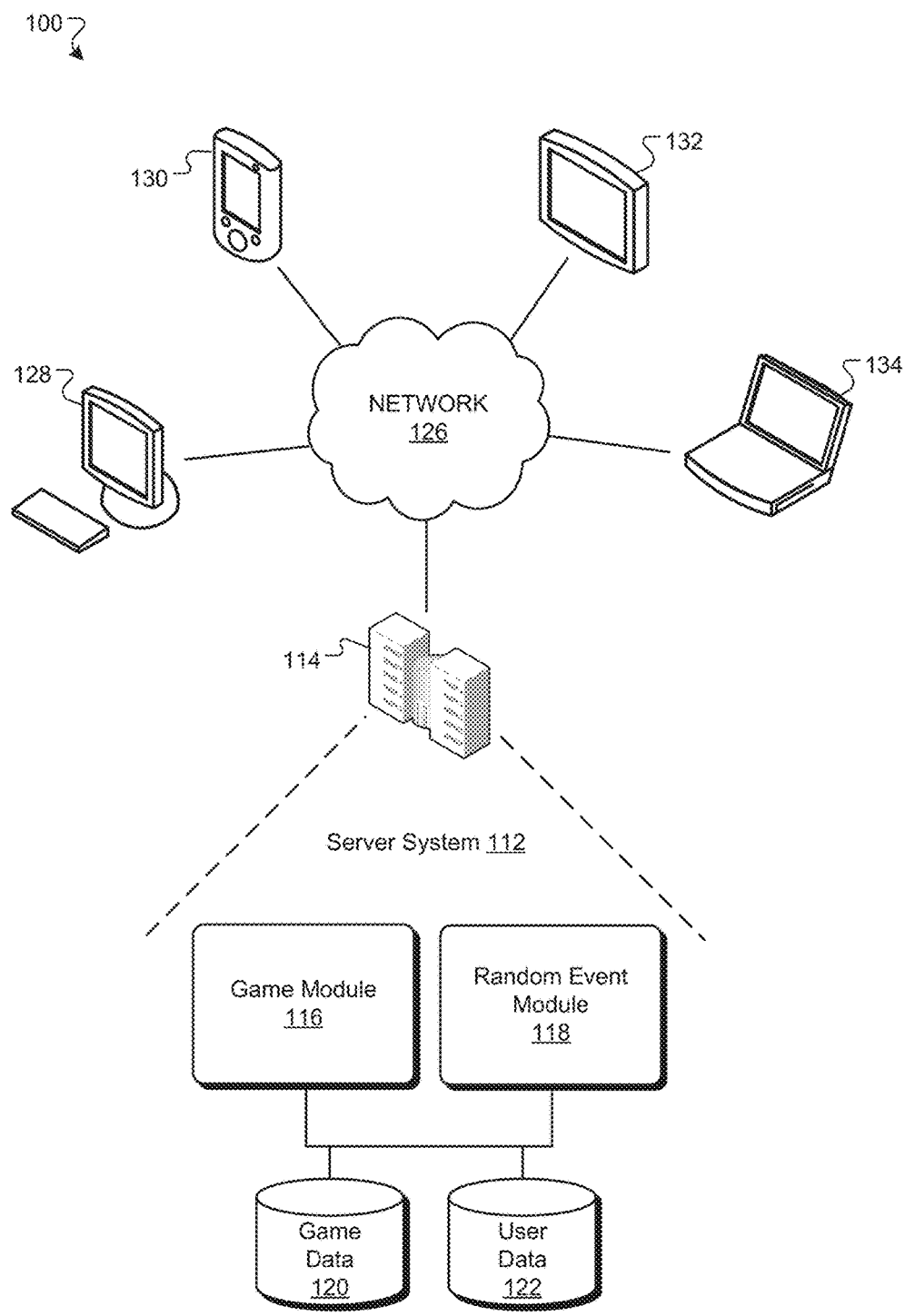
FIG. 1 is a schematic diagram of an example system for processing random events in computer games and other computer applications.

FIG. 1 illustrates an example system 100 for processing random events in a computer game or other computer application. A server system 112 provides functionality for providing an online game that involves processing random events for a plurality of users. The server system 112 includes software components and databases that can be deployed at one or more data centers 114 in one or more geographic locations, for example. The server system 112 software components can include a game module 116 and a random event module 118. The software components can include subcomponents that can execute on the same or on different individual data processing apparatus. The server system 112 databases can include game data 120 and user data 122 databases. The databases can reside in one or more physical storage systems. The software components and data will be further described below.

An application, such as, for example, a web-based application, can be provided as an end-user application to allow users to interact with the server system 112. The end-user application can be accessed through a network 126 (e.g., the Internet) by users of client devices, such as a personal computer 128, a smart phone 130, a tablet computer 132, and a laptop computer 124. Other client devices are possible. In alternative examples, the game data 120 and/or the user data 122 or any portions thereof can be stored on one or more client devices. Additionally or alternatively, software components for the system 100 (e.g., the game module 116 and/or the random event module 118) or any portions thereof can reside on or be used to perform operations on one or more client devices.

FIG. 1 depicts the game module 116 and the random event module 118 as being able to communicate with the databases (e.g., the game data 120 and the user data 122 databases). The game data 120 database generally includes information related to the multi-player online game implemented using the system 100. The game data 120 database can include, for example, information related to a virtual environment for the game, image, video and/or audio data for the game, event data corresponding to previous, current or future game events, and/or game state data defining a current state of the game. The user data 122 database generally includes data related to user interactions with the online game and/or the virtual environment. Such information can be or include, for example, a history of user connections to the system 100, user purchases, user accomplishments, user tasks, user interactions with other users (e.g., group chats), user virtual item acquisition or usage, and/or other user conditions in the virtual environment and/or real world. The user data 122 database can include information related to random events associated with users, such as, for example, a description of available random events, possible outcomes for the events, and probabilities for the outcomes.

In various examples, the users or players of the online game can have certain user capabilities in the virtual environment. The user capabilities can be or include, for example, moving an avatar or a virtual item or object to a different geographical location, interacting with characters or other users, participating in user groups or alliances, attacking other users, deploying troops, defending against an attack from other users, deploying defenses, building or modifying a virtual item or object (e.g., a virtual building or other structure), developing a new skill, operating a vehicle, acquiring a virtual item (e.g., a weapon), using or interacting with a virtual item (e.g., a playing card or a weapon), and performing supernatural tasks (e.g., casting a spell). Other user capabilities are possible.

The virtual environment for the online game can be rendered for users in the form of, for example, graphics, images, video, audio, text, and/or haptic feedback. In an adventure game, for example, a graphical user interface can display a virtual environment that includes representations of characters (e.g., people or animals), natural features (e.g., mountains, rivers, fields, trees, and/or weather conditions), and/or man-made features (e.g., buildings, bridges, and/or vehicles).

In various examples, presenting the online game to one or more users can involve the processing of random events, which can be introduced and/or processed by the random event module 118. Processing the random events can involve determining an outcome for each random event. For purposes of illustration and not limitation, the outcome can be or include, for example: a playing card or collection of playing cards, a roll of a die or dice, a coin toss, a spin of a wheel, an outcome on a slot machine or similar game of chance, an item or items in a treasure chest or other container, an outcome of a user interaction with an item, an object, or a character in the virtual environment, an outcome of a battle or other interaction among users, a change in a system parameter, and/or a change in an environmental condition. Other types of outcomes and associated random events are possible.

Figure 2:
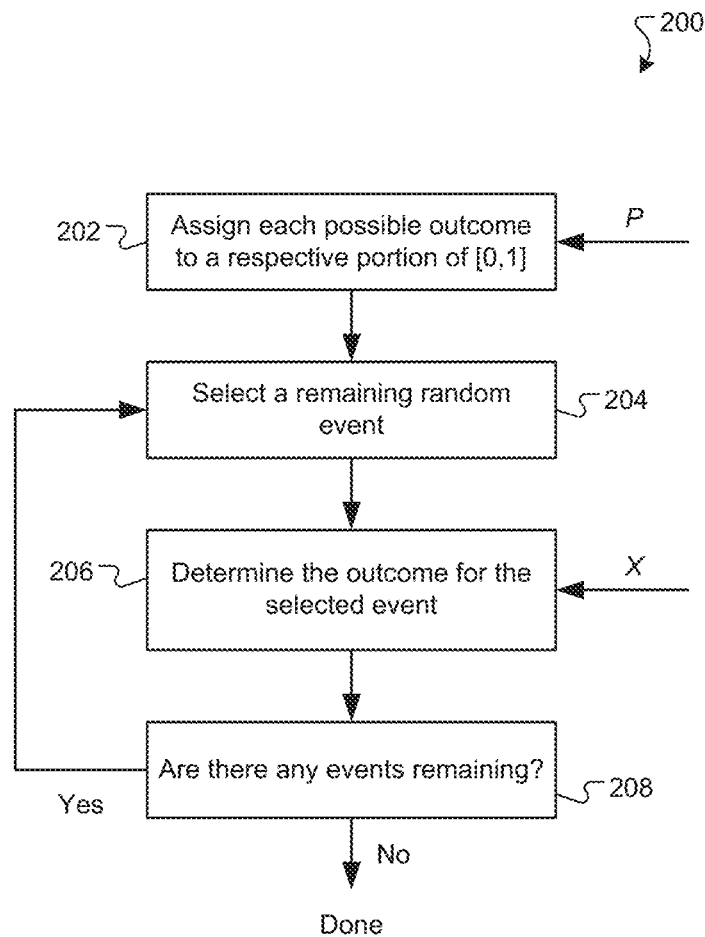
FIGS. 2 and 3 are flowcharts of example methods for processing random events.

Referring to FIG. 2, in certain implementations, a method 200 of determining the outcomes for a collection of random events can involve processing the random events one at a time. As a simple example, consider a scenario in which a user of an online game will open 1000 treasure chests and each treasure chest can contain item A, item B, or item C. The probabilities P that any given treasure chest will contain item A, item B, or item C can be, for example, 0.5, 0.3, and 0.2, respectively, as presented in Table 1. In other words, there can be a 50% likelihood that any given treasure chest contains item A, a 30% likelihood that any given treasure chest contains item B, and a 20% likelihood that any given treasure chest contains item C. The probabilities P can be defined by designers or developers of the online game, for example, in an effort to make the online game competitive, interesting, and/or fair. In alternative examples (e.g., outside the context of the online game or other game), such probabilities P can be determined based on experimental measurements and/or theoretical predictions. The probabilities P for the possible outcomes of a random event preferably add up to one.

TABLE 1

Probabilities for content of a treasure chest

| Item | Probability, P | Portion of interval [0, 1] |
| --- | --- | --- |
| A | 0.5 | 0-0.5 |
| B | 0.3 | 0.5-0.8 |
| C | 0.2 | 0.8-1.0 |

To determine the contents of each chest, the method 200 includes assigning (step 202) each possible outcome (e.g., item A, item B, and item C) to a portion of an interval from 0 to 1 (also referred to herein as "[0,1]") or other suitable interval (e.g., 0 to 10 or 0 to 100), based on the associated probabilities P for the possible outcomes. In this example, given that the probabilities P for the outcomes add to 1, item A can be assigned to 0-0.5, item B can be assigned to 0.5-0.8, and item C can be assigned to 0.8-1.0, as shown in Table 1. Next, one of the treasure chests can be selected (step 204) and the contents of the treasure chest can be determined (step 206) by generating a random number X between 0 and 1. If the random number X falls between 0 and 0.5, 0.5 and 0.8, or 0.8 and 1.0, for example, the treasure chest can be determined to contain item A, item B, or item C, respectively. If there are additional treasure chests to process (step 208), steps 204 and 206 can be repeated and additional random numbers X can be generated until the contents of all 1000 chests have been determined. In various implementations, random numbers can be generated using a pseudorandom number generator, such as, for example, Mersenne Twister, a Linear Congruential Generator, a Tausworth Generator, or a Lagged Fibonacci Generator.

This method 200 of processing each treasure chest (or other random event) one at a time can be computationally expensive, particularly when the number of treasure chests is large. Computation times for the method 200 can be proportional to the number of random events N and/or can be $O(N)$. In other words, when the number of random events N increases by a factor of 10, the computation time for performing the method 200 can also increase by a factor of 10.

Figure 3:
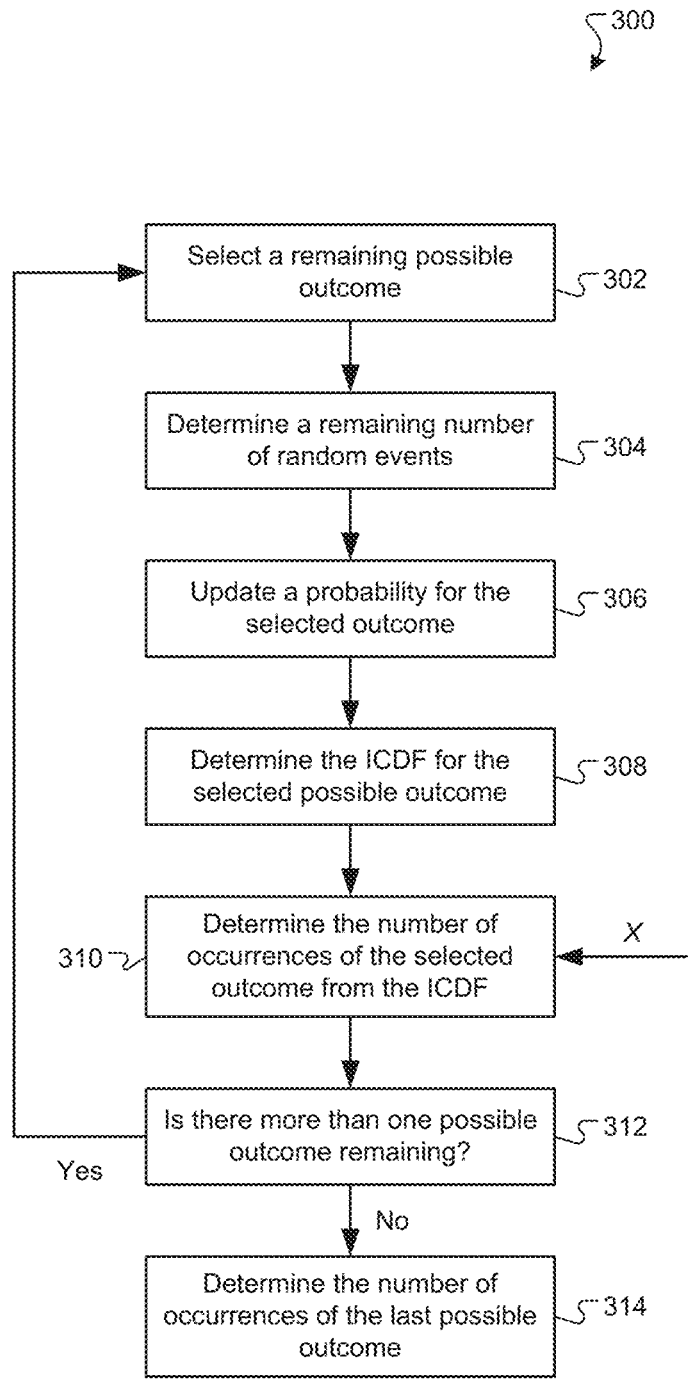

In various implementations, rather than processing or looping through each random event, the outcomes for a collection of random events can be determined by processing or looping through each possible outcome. For example, referring to FIG. 3, a method 300 can include looping through each possible outcome (rather than each random event) to determine a number of random events that have the selected outcome. In the 1000 treasure chest scenario, for example, the method 300 can begin by selecting (step 302) item A as a first possible outcome. The number of random events can be determined (step 304) to be 1000, given that there remain 1000 treasure chests to process. A probability P that item A will occur for any given remaining treasure chest can be determined (step 306) to be 0.5, as shown in Table 1. Next, a suitable mapping function or probability distribution can be determined (step 308) that can define a probability for each possible quantity of item A (e.g., from 0 to 1000) that can be present in the 1000 treasure chests. In certain examples, the probability distribution can be or include an inverse cumulative distribution function (also referred to as "ICDF" or a "quantile function"), which can be determined based on the number of random events (e.g., 1000 treasure chests in the present example) and the probability of item A occurring in any given remaining random event (e.g., 0.5 in the present example). Other types of probability distributions are possible.

Figure 4:
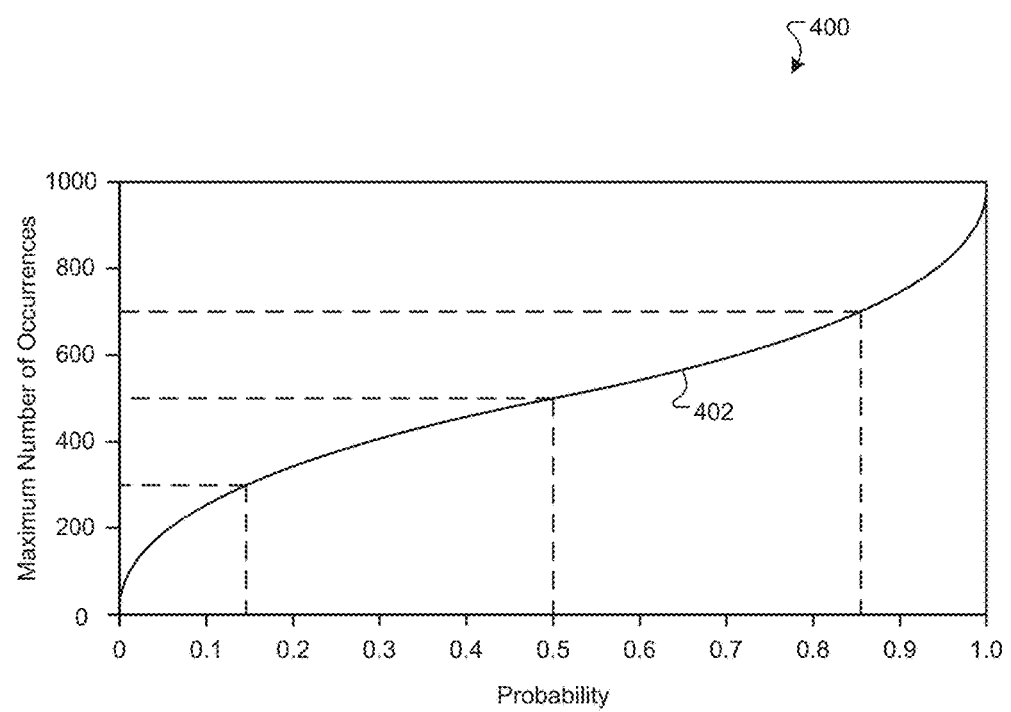
FIG. 4 is a plot of an example inverse cumulative distribution function.

For example, FIG. 4 includes a plot 400 of an ICDF 402 for item A in the scenario with the 1000 treasure chests. The x-axis in the plot 400 includes a range of probabilities from 0 to 1. These ICDF probabilities can be referred to herein as "cumulative probabilities." The y-axis in the plot 400 includes a range of a maximum number of occurrences for item A (i.e., the maximum number of treasure chests that include item A). For example, the ICDF 402 indicates that the cumulative probability of the 1000 treasure chests including at least 300 quantities of item A is about 0.15. Likewise, the ICDF 402 indicates that the cumulative probability of the 1000 treasure chests including at least 500 or at least 700 quantities of item A are 0.5 and about 0.85, respectively.

Referring again to FIG. 3, the ICDF 402 or other suitable mapping function or probability distribution can be used to determine (step 310) how many of the 1000 treasure chests include item A. To achieve this, a random number X between 0 and 1 can be generated and used as a cumulative probability value for the ICDF 402. A corresponding number of occurrences of item A can then be determined from the ICDF 402. For example, when the random number X is 0.15, the ICDF 402 can be used to determine that 300 treasure chests include item A.

Next, if the remaining number of possible outcomes is greater than one (step 312), a different possible outcome can be selected (step 302) and steps 304, 306, 308, and 310 can be repeated for the selected different possible outcome. For example, now that 300 of the treasure chests have been determined to include item A and there are two possible outcomes remaining (i.e., item B and item C), item B can be selected (step 302) as a different possible outcome. Consequently, the number of remaining random events can be determined (step 304) to be 700 (i.e., 1000−300=700), given that the contents of 700 treasure chests remain unknown. The probability of item B being present in any of the 700 remaining treasure chests can be determined (step 306) from $$P = \frac{P_{orig}}{\Sigma P_{orig}} \quad (1)$$

where P is the probability that item B is present in any remaining treasure chest, $P_{orig}$ is the original probability for item B and the 1000 treasure chests (i.e., 0.3 from Table 1), and $\Sigma P_{orig}$ is a sum of the original probabilities (for the 1000 treasure chests) for the remaining possible outcomes (i.e., item B and item C). In this case, $\Sigma P_{orig}$ is 0.5 (i.e., 0.3+0.2=0.5) and the probability P of item B being present in any of the 700 remaining treasure chests is 0.3/(0.3+0.2)=0.6.

Next, an ICDF or other appropriate probability distribution for item B can be determined (step 308). The ICDF can be determined based on the number of remaining random events (now 700) and the probability P of item B occurring in any given remaining random event (i.e., 0.6). In preferred implementations, the ICDF for item B can be similar in form to the ICDF 402. To determine the number of occurrences of item B in the remaining treasure chests, a random number X can be generated and the probability distribution for item B can be used to find a corresponding number of occurrences of item B. For example, the number of occurrences of item B in the remaining treasure chests can be determined to be 500.

Now that the quantities of item A and item B in the treasure chests have been determined to be 300 and 500, respectively, the next steps in the method 300 are to determine (step 312) that there is only one possible outcome remaining (i.e., item C) and determine (step 314) the number of occurrences for the remaining possible outcome. In this case, the number of occurrences for item C is equal to the original number of treasure chests (i.e., 1000) minus the number of treasure chests that include item A (i.e., 300) and the number of treasure chests that include item B (i.e., 500). Accordingly, the number of occurrences for item C is determined to be 200 (i.e., 1000−300−500=200). In other words, the probability that any of the remaining 200 treasure chests will include item C is 1.0 (or 100%), because the other treasure chests include either item A or item B.

This method 300 of processing or looping through each possible outcome (e.g., one at a time) can be computationally more efficient than the method 200, particularly when the number of random events N is large. Computation times for the method 300 can be proportional to the number of possible outcomes M and/or can be O(M). In other words, when the number of possible outcomes increases by a factor of 10, the computation time for performing the method 300 can also increase by a factor of 10.

In typical implementations, the ICDF can be determined in constant time (e.g., runtime can be independent of input size) using numerical approximation algorithms, such as a Binomial-Triangle-Parallelogram-Exponential (BTPE) algorithm, a Beasley-Springer-Moro algorithm, and/or an Acklam algorithm. An example for BTPE in the C programming language is available on the Internet at: http://www.icsi.berkeley.edu/ftp/pub/speech/software/praatlib-0.3/src/GSL/gsl_randist_binomial_tpe.c. Most such numerical algorithms can be statistically correct but may not work well when the number of random events N is small or when a probability of occurrence p for a possible outcome is close to 0 or 1. In some examples, the ICDF can be calculated accurately when $$Np \geq T \quad (2)$$

and $$N(1-p) \geq T, \quad (3)$$

where T is a threshold value, which can be, for example, 1, 3, 5, 7, 10, or 20. In preferred implementations, the threshold value T can be 5. When equations (2) and (3) are both satisfied, the ICDF can be calculated accurately and/or methods of using the ICDF, as described herein, such as the method 300, may be preferable to other methods described herein, such as the method 200.

The following is an example routine written in PHP programming language that can be used to determine random rewards for users of a game or other application.

```
function roll($random_reward, $roll_count = 1) {
    $remaining_rolls = roll_count;
    $remaining_probability = 1.0;
    $results = [ ];
    foreach($random_reward->outcomes as $outcome) {
        // Determine the probability of getting this outcome out of this or any
        // subsequent outcome for this random reward. Note that on the first
        // iteration, this will be equal to the probability of getting the
        // first outcome. And on the last iteration, this will be equal to 1.
        $probability = $outcome->probability / $remaining_probability;
        // Generate the ICDF for a binomial distribution where:
        //    p = the probability of getting this outcome out of this or any
        //    subsequent outcome for this random reward.
        //    n = the number of rolls that haven't been determined yet.
        // this will have an output range of [0,n].
        $ICDF = Math::Binomial_ICDF($probability, $remaining_rolls);
        // Generate a uniformly distributed random number, in the range [0,1].
        $uniform = IXRandom::GetRandFloat( );
        // Map that number to a number with binomial distribution in the
        // range [0,remaining_rolls]. This is the number of rolls that
        // have resulted in this outcome.
        $outcome_count = $ICDF($uniform);
        // Record this outcome in the result set.
        $results[$outcome->id] = $outcome_count;
        // We have determined that this many rolls resulted in this outcome,
```

```
            // so remove them from the remaining rolls,
            $remaining_rolls -= $outcome_count;
            // Since all cases of this outcome have already been determined,
  ignore
            // this outcome for subsequent rolls.
            $remaining_probability -= $probability;
            // Early out if all rolls have been determined (this also prevents
            // some bad math).
            if($remaining_probability <= 0.0)
                break;
        }
        return $results;
    }
```

In general, the ICDF is an inverse of the cumulative distribution function (CDF), which can be used to determine a probability that out of N random events a certain outcome will occur less than or equal to N times. For example, if a die is rolled 1 million times, the CDF can be used to answer the following question: what is the probability that less than 500,000 rolls result in the number one? By comparison, the ICDF can be used to answer the following inverse question: given a probability value (or a random number A), what is the number of rolls that result in the number one?

Figure 5:
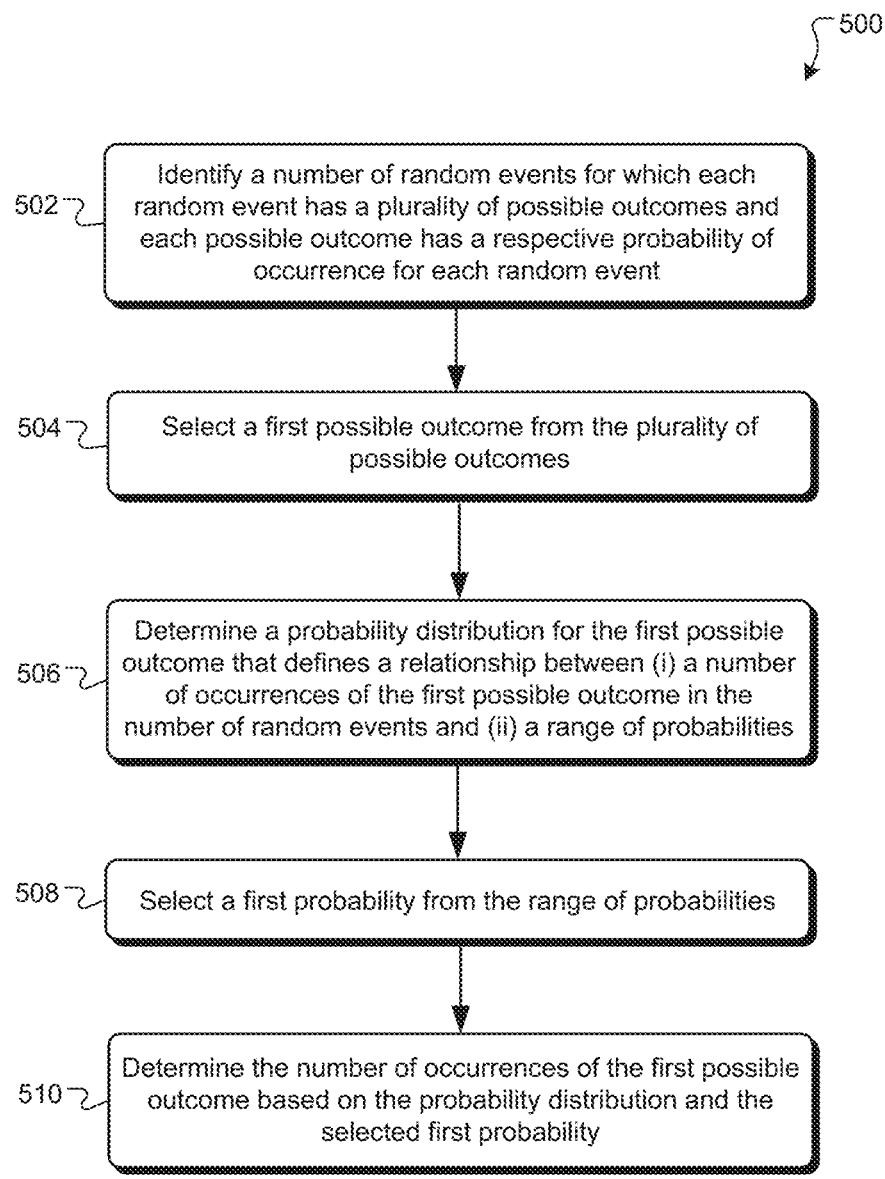
FIG. 5 is a flowchart of an example method for processing random events.

FIG. 5 illustrates an example computer-implemented method 500 of determining outcomes for a plurality of random events. A number of random events are identified (step 502) for which each random event has a plurality of possible outcomes, and each possible outcome has a respective probability of occurrence for each random event. A first possible outcome is selected (step 504) from the plurality of possible outcomes. A probability distribution is determined (step 506) for the first possible outcome. The probability distribution defines a relationship between (i) a number of occurrences of the first possible outcome in the number of random events and (ii) a range of probabilities. A first probability is selected (step 508) from the range of probabilities (e.g., by generating a random number). The number of occurrences of the first possible outcome is determined (step 510) based on the probability distribution and the selected first probability.

In various implementations, the systems and methods described herein can be used to solve a wide variety of problems in which a random event has a plurality of possible outcomes with specific probabilities. The systems and methods can be used, for example, to assign random objects, gifts, themes, images, sounds, or other possible items to a plurality of users.

While much of the subject matter described herein relates specifically to processing random events in the context of computer games, the systems and methods are equally applicable to other contexts. For example, the systems and methods can be used to process random events in computer simulations related to science, engineering, economics, finance, and other subjects. Such simulations can involve introducing and processing random events and/or random changes to system parameters or environmental conditions.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic disks, magneto-optical disks, optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including, by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse, a trackball, a touchpad, or a stylus, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what can be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A method, comprising:
   providing a computer game;
   identifying a number of random events for the computer game, each random event comprising a plurality of possible outcomes, each possible outcome comprising a respective probability of occurrence for each random event;
   selecting a first possible outcome from the plurality of possible outcomes;
   determining, by one or more computer processors, a probability distribution for the first possible outcome, the probability distribution defining a relationship between (i) a number of occurrences of the first possible outcome in the number of random events and (ii) a range of probabilities;
   selecting, by the one or more computer processors, a first probability from the range of probabilities;
   determining, by the one or more computer processors, the number of occurrences of the first possible outcome based on the probability distribution and the selected first probability; and updating a current state of the computer game according to the determined number of occurrences,
wherein updating the current state comprises assigning at least one item to a user of the computer game.

2. The method of claim 1, wherein a sum of the respective probabilities for the possible outcomes is equal to one.

3. The method of claim 1, wherein the probability distribution is based on the number of random events and the probability of occurrence for the first possible outcome.

4. The method of claim 1, wherein the probability distribution comprises the inverse cumulative distribution function.

5. The method of claim 1, wherein the range of probabilities is from 0 to 1.

6. The method of claim 1, wherein selecting the first probability comprises:
generating a first random number.

7. The method of claim 1, further comprising:
selecting a second possible outcome from the plurality of possible outcomes;
determining a remaining number of random events based on the number of random events and the determined number of occurrences of the first possible outcome;
determining a probability distribution for the second possible outcome, the probability distribution defining a relationship between (i) a number of occurrences of the second possible outcome in the remaining number of random events and (ii) the range of probabilities;
selecting a second probability from the range of probabilities; and
determining the number of occurrences of the second possible outcome based on the probability distribution and the selected second probability.

8. The method of claim 7, wherein determining the remaining number of random events comprises:
subtracting the determined number of occurrences of the first possible outcome from the number of random events.

9. The method of claim 7, wherein the probability distribution is based on the remaining number of random events and the probability of occurrence for the second possible outcome.

10. The method of claim 7, wherein selecting the second probability comprises generating a second random number.

11. A system, comprising:
one or more computer processors programmed to perform operations comprising:
providing a computer game;
identifying a number of random events for the computer game, each random event comprising a plurality of possible outcomes, each possible outcome comprising a respective probability of occurrence for each random event;
selecting a first possible outcome from the plurality of possible outcomes;
determining a probability distribution for the first possible outcome, the probability distribution defining a relationship between (i) a number of occurrences of the first possible outcome in the number of random events and (ii) a range of probabilities;
selecting a first probability from the range of probabilities;
determining the number of occurrences of the first possible outcome based on the probability distribution and the selected first probability; and
updating a current state of the computer game according to the determined number of occurrences,
wherein updating the current state comprises assigning at least one item to a user of the computer game.

12. The system of claim 11, wherein a sum of the respective probabilities for the possible outcomes is equal to one.

13. The system of claim 11, wherein the probability distribution is based on the number of random events and the probability of occurrence for the first possible outcome.

14. The system of claim 11, wherein the probability distribution comprises the inverse cumulative distribution function.

15. The system of claim 11, wherein the range of probabilities is from 0 to 1.

16. The system of claim 11, wherein selecting the first probability comprises:
generating a first random number.

17. The system of claim 11, the operations further comprising:
selecting a second possible outcome from the plurality of possible outcomes;
determining a remaining number of random events based on the number of random events and the determined number of occurrences of the first possible outcome;
determining a probability distribution for the second possible outcome, the probability distribution defining a relationship between (i) a number of occurrences of the second possible outcome in the remaining number of random events and (ii) the range of probabilities;
selecting a second probability from the range of probabilities; and
determining the number of occurrences of the second possible outcome based on the probability distribution and the selected second probability.

18. The system of claim 17, wherein determining the remaining number of random events comprises:
subtracting the determined number of occurrences of the first possible outcome from the number of random events.

19. The system of claim 17, wherein the probability distribution is based on the remaining number of random events and the probability of occurrence for the second possible outcome.

20. An article, comprising:
a non-transitory computer-readable medium having instructions stored thereon that, when executed by one or more computer processors, cause the computer processors to perform operations comprising:
providing a computer game;
identifying a number of random events for the computer game, each random event comprising a plurality of possible outcomes, each possible outcome comprising a respective probability of occurrence for each random event;
selecting a first possible outcome from the plurality of possible outcomes;
determining a probability distribution for the first possible outcome, the probability distribution defining a relationship between (i) a number of occurrences of the first possible outcome in the number of random events and (ii) a range of probabilities;
selecting a first probability from the range of probabilities;
determining the number of occurrences of the first possible outcome based on the probability distribution and the selected first probability; and updating a current state of the computer game according to the determined number of occurrences,
wherein updating the current state comprises assigning at least one item to a user of the computer game.

\* \* \* \* \*